(12) United States Patent
Mindlin et al.

(10) Patent No.: US 11,405,436 B1
(45) Date of Patent: Aug. 2, 2022

(54) USER-DEFINABLE SOUND BOUNDARIES TO REGULATE AUDIO COMMUNICATION WITHIN A VIRTUAL COLLABORATION SPACE

(71) Applicant: Verizon Patent and Licensing Inc., Basking Ridge, NJ (US)

(72) Inventors: Samuel Charles Mindlin, Pittsburgh, PA (US); Kunal Jathal, North Hills, CA (US); Shan Anis, Jersey City, NJ (US); Mohammad Raheel Khalid, Budd Lake, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/390,398

(22) Filed: Jul. 30, 2021

(51) Int. Cl.
| | | |
|---|---|---|
| *G06F 15/16* | (2006.01) | |
| *H04L 65/403* | (2022.01) | |
| *H04L 65/60* | (2022.01) | |
| *G10L 21/10* | (2013.01) | |

(52) U.S. Cl.
CPC ............ *H04L 65/403* (2013.01); *G10L 21/10* (2013.01); *H04L 65/604* (2013.01)

(58) Field of Classification Search
CPC ... H04L 65/403; H04L 65/604; H04L 65/605; G10L 21/10

USPC ......................................................... 709/204
See application file for complete search history.

(56) References Cited

U.S. PATENT DOCUMENTS

| | | | |
|---|---|---|---|
| 10,825,460 B1* | 11/2020 | Ramalho | ................. G10L 25/51 |
| 2012/0128147 A1* | 5/2012 | Callanan | ............ H04L 12/1822 |
| | | | 379/207.02 |
| 2017/0099361 A1* | 4/2017 | Digilov | ................... H04L 67/02 |
| 2018/0103073 A1* | 4/2018 | Rosenberg | ............ H04L 63/102 |
| 2018/0139565 A1* | 5/2018 | Norris | ...................... H04S 7/304 |
| 2021/0135895 A1* | 5/2021 | Cheung | ................. G06V 40/172 |

\* cited by examiner

*Primary Examiner* — Ruolei Zong

(57) ABSTRACT

An illustrative collaboration space provider system provides a virtual collaboration experience that allows for audio communication between a plurality of users represented by a plurality of avatars located within a virtual collaboration space. The collaboration space provider system defines, based on user input from a first user included in the plurality of users and represented by a first avatar located within the virtual collaboration space, a sound boundary between a first location of the first avatar within the virtual collaboration space and a second location of a second avatar within the virtual collaboration space. Based on the sound boundary between the first and second locations, the collaboration space provider system then prevents audio communication in at least one direction between the first user and a second user represented by the second avatar. Corresponding methods and systems are also disclosed.

20 Claims, 9 Drawing Sheets

USER-DEFINABLE SOUND BOUNDARIES TO REGULATE AUDIO COMMUNICATION WITHIN A VIRTUAL COLLABORATION SPACE

BACKGROUND INFORMATION

The combination of various conditions and events in recent years has created a demand for ever more effective, convenient, and flexible ways of facilitating communication between people who are located remotely from one another. As one example, the increase in the number of people who perform some or all their work from home or other convenient locations rather than from a physical office space or other shared physical space has increased dramatically.

Many positive consequences have attended these increases in remote communication and telecommuting. Unfortunately, along with the gains, certain communication challenges have also presented themselves. For example, when employees do not share a physical space and are forced to take deliberate steps to initiate communication exchanges (e.g., phone calls, video calls, text chats, etc.), some important impromptu interactions (e.g., hallway conversations, office pop-ins, conversations that are overheard and joined without explicit invitations, etc.) have diminished.

BRIEF DESCRIPTION OF THE DRAWINGS

The accompanying drawings illustrate various implementations and are a part of the specification. The illustrated implementations are merely examples and do not limit the scope of the disclosure. Throughout the drawings, identical or similar reference numbers designate identical or similar elements.

DETAILED DESCRIPTION OF EXAMPLE EMBODIMENTS

Figure 1:
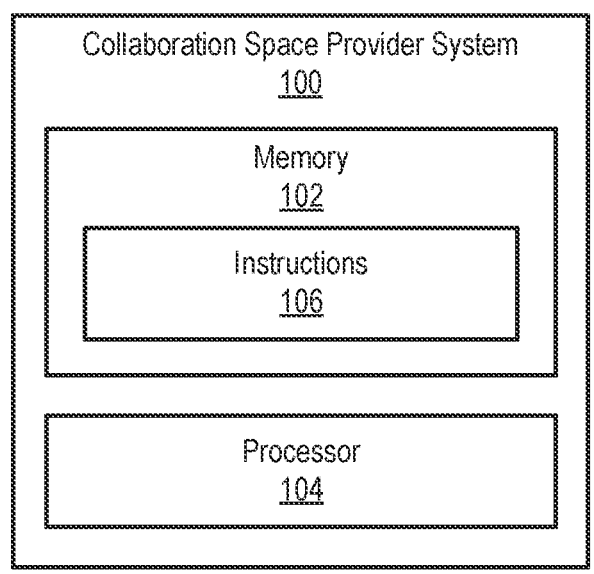
FIG. 1 shows an illustrative collaboration space provider system configured to provide user-definable sound boundaries to regulate audio communication within a virtual collaboration space in accordance with principles described herein.

User-definable sound boundaries to regulate audio communication within a virtual collaboration space are described herein. As mentioned above, certain challenges have presented themselves alongside the various advantages of increased remote communication trends. For instance, coworkers may no longer enjoy the ability to casually converse in the breakroom while having a snack, to chat briefly when passing in the hall, to subconsciously overhear conversations by others within an open workspace (e.g., conversations that, if relevant, a worker may choose to join in on), and so forth. Some organizations (e.g., companies, firms, practices, non-profits, etc.) are discovering that, over time, these challenges can take a toll on social capital within the organization. For instance, these challenges may create meeting fatigue (since preplanned calls and meetings generally must be relied on for any communication to take place), may contribute to a lack of workplace camaraderie and effective teamwork, may reduce informal cross-departmental and/or skip-level interactions, and may thereby generally lead to less collaboration, less innovation, less efficiency, and/or other undesirable outcomes.

As a response to these challenges (as well as other factors), collaboration space provider systems described herein are configured to provide virtual collaboration experiences that allow for audio communication (e.g., voice communication as well as other types of audio sharing including music, prerecorded audio, non-verbal audio, etc.) between users represented by respective avatars located within a virtual collaboration space generated by the collaboration space provider systems. In certain examples, the audio communication provided by these systems may be standard electronic communications such as phone or video calls, virtual voice or video meetings that are setup ahead of time, and so forth. In other examples, the audio communication provided by collaboration space provider systems described herein may be impromptu voice communications distinct from voice communications traditionally provided by electronic communications systems. For instance, collaboration space provider systems described herein may allow for an "always-on" virtual collaboration experience in which audio communication is transmitted between users based on virtual proximity of avatars, availability status set by users (such that communications may come in most the time but need not be literally "always" on since users may wish to temporarily suspend impromptu communications for various reasons), and so forth.

Virtual collaboration experiences of this type may be enjoyed by users represented by respective avatars (e.g., humanoid avatars or other characters or symbols that represent the users) that exist within a virtual collaboration space provided by the collaboration space provider system. Rather than requiring remote communication to be actively initiated (e.g., sending a message, scheduling and joining a meeting, placing a call, etc.), virtual collaboration experiences allow users to engage in impromptu and informal communications by attributing virtual locations to each avatar and generally leaving communication channels open (e.g., leaving microphones and speakers on, etc.) throughout the virtual collaboration experience in a way that facilitates real-world interactions. In this way, for example, users (e.g., employees of an organization who are working from home and virtually located within a virtual collaboration space) may communicate in an informal and impromptu manner by simply beginning to talk. As such spoken communication is captured, collaboration space provider systems described herein direct the spoken communication to be presented to other users who are within the virtual vicinity of the user who is speaking (provided that these users are available for receiving such communications), while not distracting users virtually outside of the vicinity of the speaking user.

As will be described in more detail below, these systems and methods may allow users to engage in and/or overhear various informal conversations happening in their virtual vicinity in a natural way that reduces the challenges described above and leads to easier collaboration, increased social capital, and other desirable outcomes. Additionally, such methods of facilitating impromptu communications may be closely integrated with convenient options for converting impromptu communications into more formal or private conversations (e.g., analogous to deciding to step from the hallway into a conference room as a conversation develops or when a whiteboard would be useful, etc.).

Even with such benefits, however, an additional challenge may remain for users engaged in a virtual collaboration experience, particularly for users who are relatively unexperienced with such forms of communication. This challenge relates to a user's ability to precisely understand and control the reach of his or her voice when delivering an impromptu voice communication. With a conventional electronic communication such as a phone call, a person can confidently assume that only the intended recipient who the user has called can hear his or her voice and that people not on the call are not privy to the conversation. Similarly, when speaking in a real-world collaborative space (e.g., an open office space, etc.), the person has a natural sense of how far his or her voice carries in the space such that the person can accurately discern and predict who will be privy to the conversation. The challenge presented by virtual collaboration such as described herein thus relates to the lower level of confidence and control users may have regarding who can hear their voice communications in a virtual collaboration space. A user may not want to shout if other users can hear him when speaking in a normal voice, nor may the user want to speak at a low volume with one intended recipient just to find out that many others in the vicinity can easily hear the communications.

To address these additional challenges, methods and systems described herein relate to user-definable sound boundaries configured to regulate audio communication (e.g., including voice communication) within a virtual collaboration space. For example, as will be described in more detail below, if a first user engaging with others in a virtual collaboration experience wishes to have a private conversation with a second user sitting nearby, the first user may provide user input that allows the system to define a sound boundary (e.g., a boundary enclosing the first and second users, a boundary separating the first and second users from a third user nearby who is not an intended recipient of the audio communication, etc.) that acts as a baffle or barrier such that virtual sound does not propagate from the first user to the third user. In some examples, such sound boundaries may serve to form an acoustically isolated space in which two or more users may have an impromptu, yet private, conversation while having full understanding and control of who is able to hear the conversation.

Sound boundaries such as these may be imbued with various characteristics that may mimic real-world sound baffles, as well as characteristics that would be impossible to perfectly implement in a real-world sound baffle. For instance, virtual sound boundaries such as described above may not just muffle or attenuate sound in the way a real-world baffle would, but may serve to perfectly eliminate and mute the sound in very precisely-controllable ways (e.g., such that a particular user is incapable of hearing the communication at all). As another example, virtual sound boundaries may be either bidirectional (perfectly blocking sound from traveling either direction) or unidirectional (completely blocking sound traveling in one direction while not interfering at all with sound traveling in the other direction). Additionally, virtual sound boundaries may be visible or invisible, traversable or non-traversable (or traversable only with special permissions, notifications, etc.), fully configurable by users, and highly efficient for collaboration space provider systems to implement. These and various other benefits and advantages of user-definable sound boundaries for regulating audio communication within a virtual collaboration space will be described in more detail below.

Shared virtual office spaces of organizations like companies or firms provide a convenient illustrative use case for virtual collaboration spaces where virtual collaboration experiences and sound boundaries described herein may be highly effective and helpful. However, it will be understood that principles described herein may also be applied to various other types of virtual collaboration spaces (other than virtual office spaces) for various other types of use cases as may serve a particular implementation. For example, such spaces and applications may include entertainment spaces (e.g., a virtual theater for screening a movie for a virtual movie festival, a virtual sports box for watching a sporting event with friends, etc.), virtual convention venues (e.g., virtual spaces configured to host large-scale conferences, forums, trade shows, rallies, or other conventions, etc.), spaces configured with games and other interactive events (e.g., used for hosting family or class reunions, virtual birthday parties, etc.), and/or any other shared virtual spaces as may serve a particular implementation.

Additional use cases that may be served by systems and methods described herein may relate to applications such as control room applications (e.g., used during and after an event to oversee everything and make sure it goes as planned), health care applications (e.g., to help patients move through prescribed steps during a visit such as checking in, talking to the doctor, checking out, etc.), help desk applications (e.g., allowing people to virtually walk up to a virtual information technology ("IT") help desk or corporate security desk), education applications (e.g., study groups, labs and higher education classes, etc.), team building applications, hybrid applications (e.g., in which users in the office interact with remote users), human resources applications (e.g., to facilitate employee onboarding, recruiting, compensation negotiations, etc.), and/or any other applications as may serve a particular implementation.

Various specific implementations will now be described in detail with reference to the figures. It will be understood that the specific implementations described below are provided as non-limiting examples and may be applied in various situations. Additionally, it will be understood that other examples not explicitly described herein may also be captured by the scope of the claims set forth below. User-definable sound boundaries described herein for regulating audio communication within a virtual collaboration space may provide any of the benefits mentioned above, as well as various additional and/or alternative benefits that will be described and/or made apparent below.

FIG. 1 shows an illustrative collaboration space provider system 100 ("system 100") configured to provide user-definable sound boundaries to regulate audio communication within a virtual collaboration space in accordance with principles described herein. System 100 may be implemented by computer resources such as processors, memory facilities, storage facilities, communication interfaces, and so forth. In some examples, system 100 may be implemented by user equipment (UE) devices such as personal computers, mobile devices, communication devices, or other equipment used directly by end users. Additionally or alternatively, certain or all aspects of system 100 may be implemented by computing systems that are not directly used by users. For example, system 100 may be fully or partially implemented by data servers configured to provide communication services, distributed computing systems operated by a communications provider (e.g., multi-access edge computing (MEC) servers), distributed computing systems operated by a cloud-computing provider (e.g., multi-access cloud servers), or other suitable computing systems.

As shown, system 100 may include, without limitation, a memory 102 and a processor 104 selectively and communicatively coupled to one another. Memory 102 and processor 104 may each include or be implemented by computer hardware that is configured to store and/or execute computer software. Various other components of computer hardware and/or software not explicitly shown in FIG. 1 may also be included within system 100. In some examples, memory 102 and processor 104 may be distributed between multiple devices and/or multiple locations as may serve a particular implementation.

Memory 102 may store and/or otherwise maintain executable data used by processor 104 to perform any of the functionality described herein. For example, memory 102 may store instructions 106 that may be executed by processor 104. Memory 102 may be implemented by one or more memory or storage devices, including any memory or storage devices described herein, that are configured to store data in a transitory or non-transitory manner. Instructions 106 may be executed by processor 104 to cause system 100 to perform any of the functionality described herein. Instructions 106 may be implemented by any suitable application, software, script, code, and/or other executable data instance. Additionally, memory 102 may also maintain any other data accessed, managed, used, and/or transmitted by processor 104 in a particular implementation.

Processor 104 may be implemented by one or more computer processing devices, including general purpose processors (e.g., central processing units (CPUs), graphics processing units (GPUs), microprocessors, etc.), special purpose processors (e.g., application-specific integrated circuits (ASICs), field-programmable gate arrays (FPGAs), etc.), or the like. Using processor 104 (e.g., when processor 104 is directed to perform operations represented by instructions 106 stored in memory 102), system 100 may perform functions associated with user-definable sound boundaries used to regulate audio communication within a virtual collaboration space as described herein and/or as may serve a particular implementation.

Figure 2:
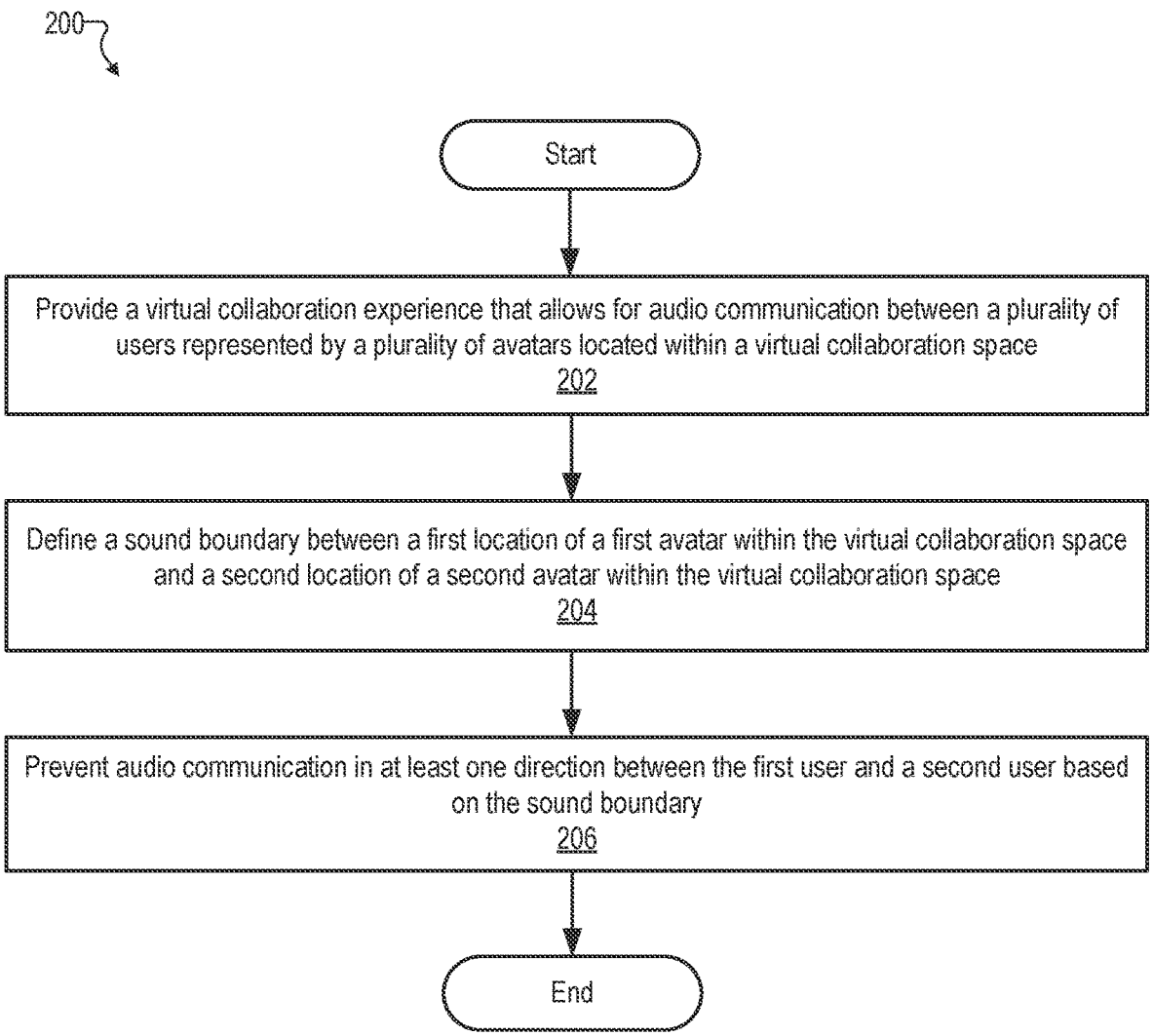
FIG. 2 shows an illustrative method for providing user-definable sound boundaries to regulate audio communication within a virtual collaboration space in accordance with principles described herein.

As one example of functionality that processor 104 may perform, FIG. 2 shows an illustrative method 200 for providing user-definable sound boundaries to regulate audio communication within a virtual collaboration space in accordance with principles described herein. While FIG. 2 shows illustrative operations according to one implementation, other implementations may omit, add to, reorder, and/or modify any of the operations shown in FIG. 2. In some examples, multiple operations shown in FIG. 2 or described in relation to FIG. 2 may be performed concurrently (e.g., in parallel) with one another, rather than being performed sequentially as illustrated and/or described. One or more of the operations shown in FIG. 2 may be performed by a communication provider system such as system 100 and/or any implementation thereof.

In some examples, the operations of FIG. 2 may be performed in real time so as to provide, receive, process, and/or use data described herein immediately as the data is generated, updated, changed, exchanged, or otherwise becomes available. Moreover, certain operations described herein may involve real-time data, real-time representations, real-time conditions, and/or other real-time circumstances. As used herein, "real time" will be understood to relate to data processing and/or other actions that are performed immediately, as well as conditions and/or circumstances that are accounted for as they exist in the moment when the processing or other actions are performed. For example, a real-time operation may refer to an operation that is performed immediately and without undue delay, even if it is not possible for there to be absolutely zero delay. Similarly, real-time data, real-time representations, real-time conditions, and so forth, will be understood to refer to data, representations, and conditions that relate to a present moment in time or a moment in time when decisions are being made and operations are being performed (e.g., even if after a short delay), such that the data, representations, conditions, and so forth are temporally relevant to the decisions being made and/or the operations being performed.

Each of operations 202-206 of method 200 will now be described in more detail as the operations may be performed by system 100 (e.g., by processor 104 as processor 104 executes instructions 106 stored in memory 102).

At operation 202, system 100 may provide a virtual collaboration experience that allows for audio communication between a plurality of users represented by a plurality of avatars located within a virtual collaboration space. For example, as mentioned above and as will be illustrated and described in more detail below, one example of a virtual collaboration space may be a virtual office workspace in which a team of office workers may virtually work together. In this example, the virtual collaboration experience may be associated with an office workday during which the plurality of users collaborate on one or more tasks within the virtual office workspace. As such, communication channels between users whose avatars are relatively proximate to one another may generally be left open so that, throughout the workday (besides when entering a virtual meeting, indicating that they do not wish to be disturbed, etc.) each user may hear audio communications happening in the virtual vicinity around him or her, and may project voice communications into the virtual collaboration space to be heard by others according to their proximity and availability status as well. In other examples, the virtual collaboration experience provided at operation 202 may involve a virtual collaboration space other than a virtual office workspace, such as any of the other types of virtual spaces described herein.

At operation 204, system 100 may define a sound boundary between a first location of a first avatar within the virtual collaboration space and a second location of a second avatar within the virtual collaboration space. The defining of the sound boundary at operation 204 may be performed automatically and/or based on any data that has been provided by one or more users. For instance, in one example, the sound boundary may be defined based on user input from a first user included in the plurality of users and represented by the first avatar. The first user may indicate, for example, that the system is to place the sound boundary so as to enclose the first avatar and another nearby avatar (e.g., a third avatar representing a third user included in the plurality of users) in a manner that excludes or leaves out the second avatar (which may represent a second user included in the plurality of users).

At operation 206, system 100 may prevent audio communication in at least one direction between the first user and the second user based on the sound boundary defined within the virtual collaboration space between the first and second locations at operation 204. For example, just as the second avatar is excluded from or left out of the area enclosed by the sound boundary described in the example above (e.g., the area of the virtual collaboration space in which the first and third avatars are located), the second user may be prevented from hearing the audio communication spoken by at least the first user (since the first user provided the user input to set up the sound boundary) and, in certain examples, audio communication spoken by either the first or third users (who may wish for their one-on-one conversation to be both impromptu and private in this example).

As will be described in more detail below, the preventing of the audio communication at operation 206 may function bidirectionally or unidirectionally as may serve a particular implementation, or as may be desired by the first user (e.g. as indicated in the user input provided to direct system 100 to generate the sound boundary at operation 204). For example, as mentioned above, a bidirectional sound boundary between the first and second avatars may cause the first user to not receive audio communications from the second user, as well as the second user to not receive audio communications from the first user. In contrast, a unidirectional sound boundary may allow audio communication to travel in one direction (e.g., from the first avatar to the second or from the second avatar to the first) while preventing travel in the opposite direction, as will be described and illustrated in more detail below.

Additional operations may be added to method 200 to provide various other features and behaviors of sound boundaries and virtual collaboration experiences described herein. For example, after preventing audio communication for a period of time at operation 206, a certain event (e.g., additional user input being received, the expiration of an automatic timer, etc.) may cause the sound boundary to be removed so that audio communication between the first and second users may again be delivered (rather than prevented).

Figure 3:
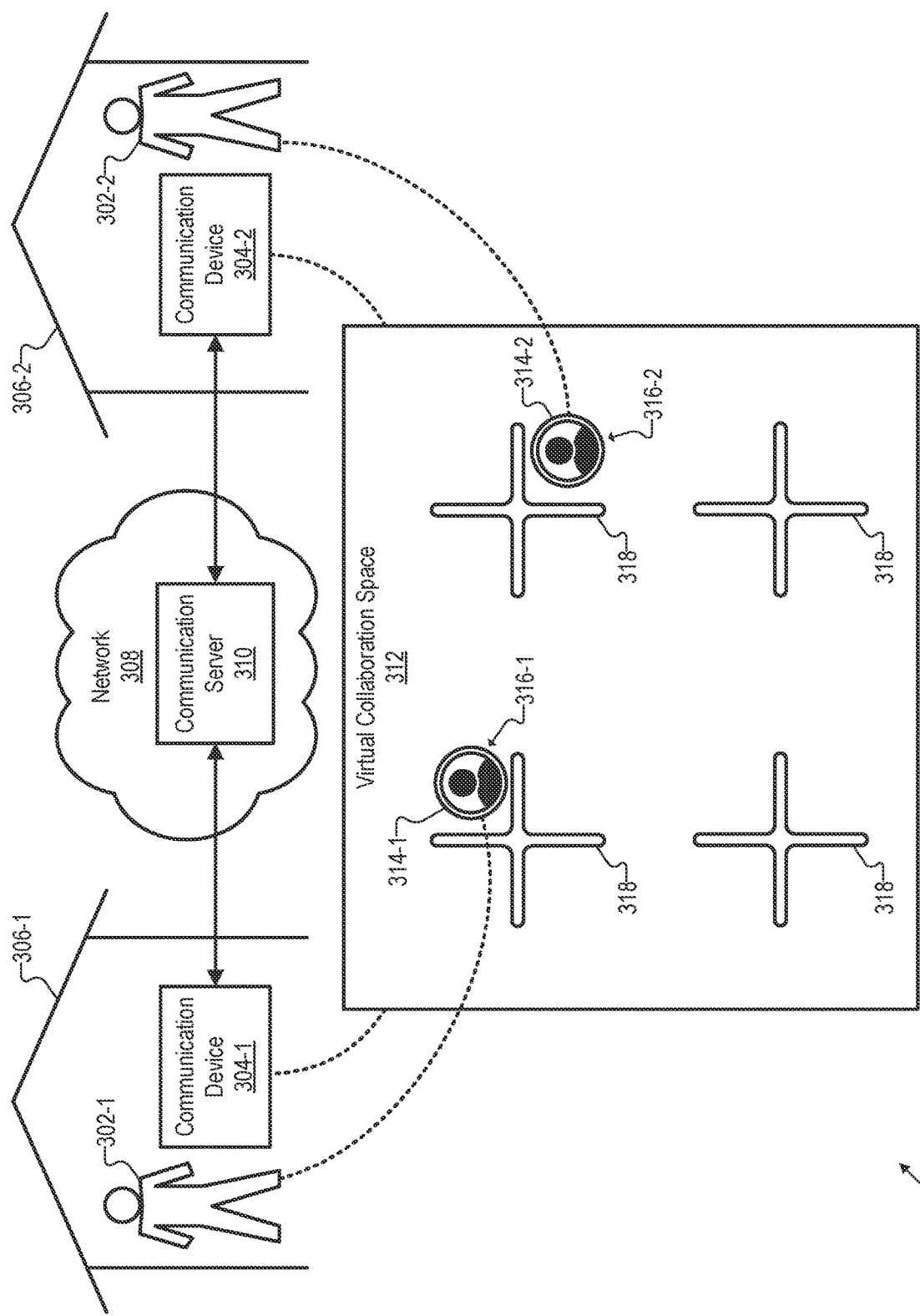
FIG. 3 shows an illustrative configuration in which the collaboration space provider system of FIG. 1 may provide an illustrative virtual collaboration space in accordance with principles described herein.

FIG. 3 shows an illustrative configuration 300 in which system 100 may provide an illustrative virtual collaboration space in accordance with principles described herein. Specifically, as shown, configuration 300 shows first and second users 302 (i.e., users 302-1 and 302-2) that use respective communication devices 304 (i.e., communication devices 304-1 and 304-2) to communicate from different sites 306 (i.e., sites 306-1 and 306-2) over a network 308 that may employ a communication server 310 to facilitate or manage the communication. An implementation of system 100 may be implemented within either or both communication devices 304, within communication server 310 or components of network 308, or by computing resources spread across a combination of these or other suitable systems and devices. In certain examples, each communication device 304 may be associated with (e.g., may implement or be communicatively coupled with) a respective implementation of system 100 that may function in similar ways to provide communication capabilities for the respective users 302 using the communication devices 304.

Also shown in configuration 300 is a virtual collaboration space 312 that may be provided by system 100 to allow users 302 to engage in audio communication during a virtual collaboration experience such as described herein. A visual representation of virtual collaboration space 312 may be presented to each of users 302 by his or her respective communication device 304, as indicated by dotted lines connecting communication devices 304 to virtual collaboration space 312. One or more avatars 314 (e.g., avatars 314-1 and 314-2) may be located within virtual collaboration space 312 at respective locations 316 (e.g., locations 316-1 and 316-2). Avatars 314 will be understood to represent users 302 within virtual collaboration space 312, as indicated by the dotted lines connecting the users and avatars (e.g., connecting user 302-1 to avatar 314-1 and connecting user 302-2 to avatar 314-2). Within a configuration such as configuration 300, system 100 may perform the operations of method 200 and/or any other operations described herein. Certain aspects of components depicted in configuration 300 will now be described in more detail.

Users 302 may represent persons who are using system 100 in any suitable way, such as to communicate with one another or with other users who are not explicitly shown in configuration 300. For example, users 302 may represent employees of an organization (e.g., a company) who are working from home and need to communicate with one another and/or with other employees (e.g., other employees working from home, employees who are in the office, etc.) as part of their work assignments.

Communication devices 304 may be used by users 302 to engage in a virtual collaboration experience (e.g., a virtual workday, etc.) within a virtual collaboration space 312 in various ways as may serve a particular implementation. To this end, communication devices 304 may be implemented by any suitable computing devices, media player devices, communication devices, or the like, as may be configured to support a particular type of virtual collaboration experience. For example, a communication device 304 may be implemented by a user equipment device such as mobile device (e.g., a smartphone, a tablet device, etc.), a personal computer (e.g., a laptop or desktop computer, etc.), or another such device that may be used by a user 302 to perform work-related tasks or otherwise to communicate as may be desirable for a particular communication application or use case.

In certain examples, a communication device 304 may have a capability of presenting a 3D view of virtual collaboration space 312 rather than or in addition to the 2D overhead view illustrated in FIG. 3. For instance, while virtual collaboration space 312 in FIG. 3 shows, from a top view, 2D symbols 318 representing desk clumps or other furnishings and objects within virtual collaboration space 312, a 3D view of virtual collaboration space 312 may show a perspective view of an office space including 3D desks, chairs, partitions, computers, and/or other such objects. Similarly, while the illustrated 2D view of virtual collaboration space 312 shows avatars 314 as 2D symbols (e.g., pictures of users in a circular icon in this example), a 3D view of virtual collaboration space 312 may show avatars 314 as 3D virtual human characters that walk around the space, sit in chairs while working at a particular desk, and so forth.

In addition or as an alternative to presenting a 3D view of virtual collaboration space 312 on a conventional screen (e.g., a computer monitor, a smartphone or tablet screen, etc.), certain communication devices 304 may be configured to present an immersive virtual collaboration experience in which virtual collaboration space 312 and the objects included therein (e.g., avatars 314, furnishings represented by symbols 318, etc.) are presented using an extended reality technology (e.g., virtual reality technology, augmented reality technology, etc.). Accordingly, certain implementations of communication devices 304 may include or be associated with extended reality presentation devices such as head-mounted virtual reality devices or other such devices configured to present extended reality worlds. In some examples, users 302 may switch between 2D and 3D views of virtual collaboration space 312 at will.

In the example of configuration 300, sites 306 may be understood to represent two unrelated sites that are remote from one another. For example, sites 306 may represent the respective homes of users 302, which may be at different addresses nearby one another (e.g., in the same city, etc.) or across the country or the world from one another. As another example, one or both of sites 306 may represent remote workspaces other than home in which users 302 are working at a given time. For instance, sites 306 may represent college campuses, coffee shops, temporary office spaces, or the like. In certain cases, sites 306 may represent different physical offices that are operated (e.g., owned or leased) by a particular organization, such as different offices of the organization located in different cities. Sites 306 may also represent different offices within the same building (e.g., an apartment building, a physical office building) if the sites are remote enough from one another that it is desirable for users 302 to communicate electronically using virtual collaboration space 312 rather than in person.

Network 308 may be implemented by any suitable network or networks that include any elements or technologies as may serve a particular implementation. For instance, network 308 may include elements of a provider-specific wired or wireless communications network (e.g., a cellular network used for mobile phone and data communications, a 5G network or network of another suitable technology generation, a cable or satellite carrier network, a mobile telephone network, etc.) operated and/or managed by a provider entity such as a mobile network operator (e.g., a wireless service provider, a wireless carrier, a cellular company, etc.). Additionally or alternatively, network 308 may include elements of various interconnected networks that are outside of any provider network and outside the control of any provider of such a provider network. Elements of the Internet, a wide area network, a content delivery network, and/or any other suitable network or networks are examples of other elements that may be included within network 308. Any of these provider or non-provider networks or network elements may provide data delivery between different communication devices 304.

Communication server 310 may be communicatively coupled to either or both of communication devices 304 by way of network 308 and may facilitate communications between communication devices 304 in any manner as may serve a particular implementation. For instance, in certain implementations, communication server 310 may represent one or more MEC server devices, cloud server devices, or other distributed computing devices that manage communication data between communication devices 304 in the ways described herein. As mentioned above, in certain examples, system 100 may be fully or partially implemented by communication server 310. In other examples, implementations of system 100 may exist on each of communication devices 304 and communication server 310 may be omitted or perform other operations to facilitate the communication provided by communication device 304. In some implementations, multiple communication servers 310 may be employed in a distributed fashion, such as for purposes of scalability, redundancy, and service quality (e.g., latency reduction), and system 100 may be deployed across such multiple communications servers 310.

Figure 4:
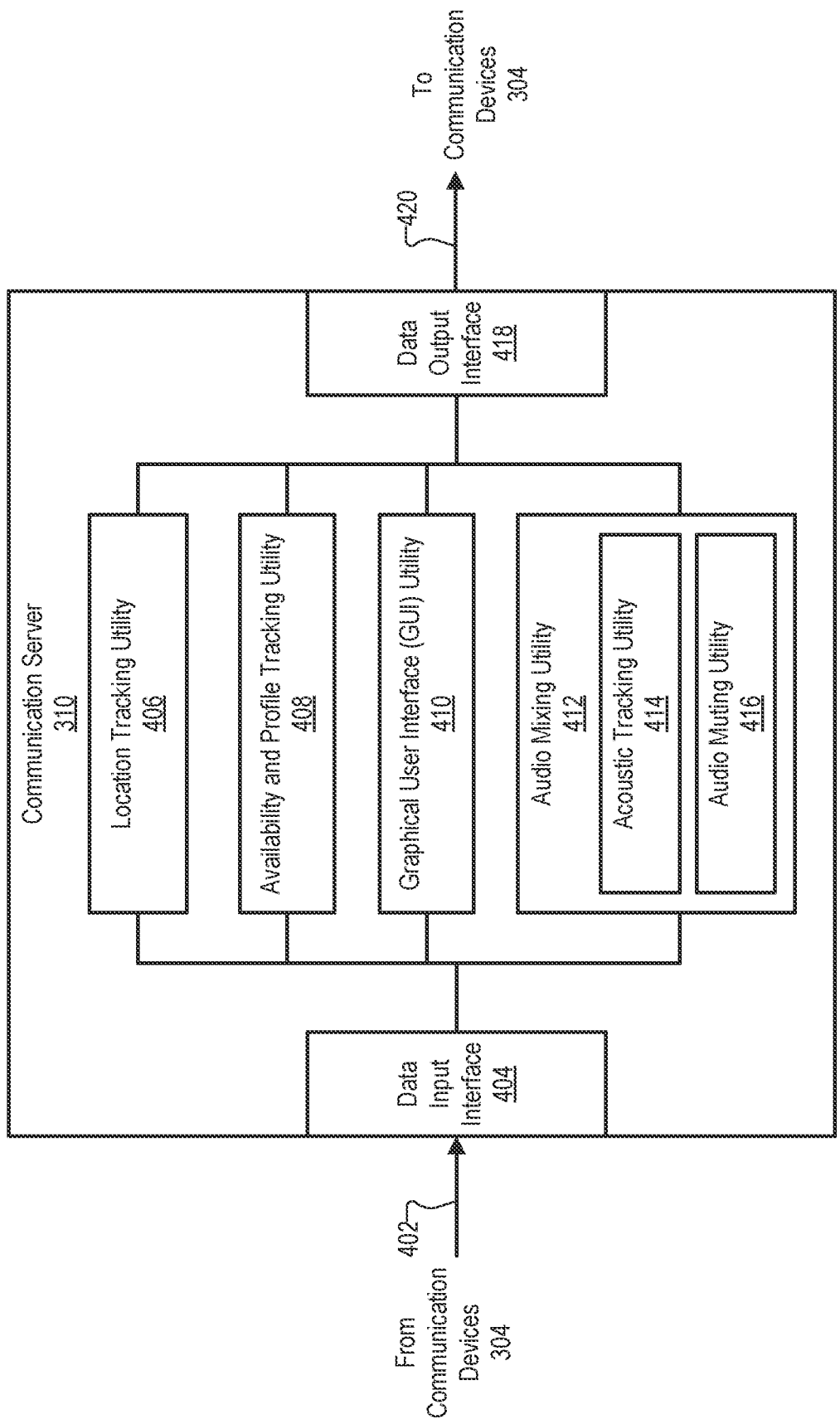
FIG. 4 shows an illustrative implementation of a communication server such as is included in the configuration of FIG. 3 in accordance with principles described herein.

To illustrate one particular way that communication server 310 may be implemented in certain embodiments, FIG. 4 shows an illustrative implementation of communication server 310 that includes various data inputs, data outputs, communication interfaces, and processing utilities to perform operations described herein. Specifically, as shown in FIG. 4, this implementation of communication server 310 receives input data 402 from one or more communication devices 304 using a data input interface 404, which provides relevant input data to a location tracking utility 406, an availability and profile tracking utility 408, a graphical user interface (GUI) utility 410, and an audio mixing utility 412 having subutilities including an acoustic tracking utility 414 and an audio muting utility 416. As shown, each of these and/or any other utilities not explicitly shown may communicate with one another by way of a service bus or another suitable architecture or form of communication. Utilities 406-416 may generate and/or update audio data, user interface data (e.g., video data), etc., for presentation within a graphical user interface displayed by communication devices 304 (e.g., a graphical user interface that includes a 2D and/or 3D representation of virtual collaboration space 312). Audio data and/or user interface data generated by utilities 406 through 416 may be provided to a data output interface 418 that provides this information to communication devices 304 as output data 420. Each of the components shown in FIG. 4 will now be described in more detail.

Input data 402 may include any suitable data received (e.g., transmitted in real time) from one or more communication devices such as communication devices 304-1 and 304-2 shown in configuration 300. Input data 402 may include audio data such as voice or other audio data representative of impromptu communication being provided by one of users 302 or audio data that is part of a communication session such as a call or conference. Input data 402 may also include other types of user input data and/or metadata that may, for instance, indicate when a user 302 logs into the virtual collaboration experience (e.g., by logging into a communication portal that provides the virtual collaboration experience, etc.), where a user 302 desires to set and/or move the location of his or her avatar 314, whether a user 302 is available for various types of communication, profile information associated with the user, and so forth.

Data input interface 404 may receive input data 402 by way of a network such as network 308. As such, data input interface 404 may be configured to communicate with communication devices 304 by way of any technologies and/or protocols supported by the network as may serve a particular implementation. In some examples, data input interface 404 may preprocess, sort, and/or steer input data 402 to utilities 406-416 to ensure that each utility receives any input data that is relevant to the function of that utility.

Location tracking utility 406 may receive and process user input data 402 and provide, in real time, information regarding the virtual locations of each avatar 314 included within a virtual collaboration space. From the time that a user logs into a virtual collaboration experience until he or she logs out, location tracking utility 406 may identify, update, and/or otherwise keep track of the virtual location of an avatar of that user. As location tracking utility 406 generates this location data, location tracking utility 406 may provide the location data to GUI utility 410 to indicate where avatars for each user are to be placed within the representation of the virtual collaboration space. Additionally, the location data may be provided to audio mixing utility 412 to facilitate in audio mixing operations. For example, impromptu voice communication may be mixed at a sound intensity level that may depend on a relative proximity of one avatar to another and muting of certain audio communication may be performed based on sound boundaries that have been defined and implemented within the space. Additionally, location data may inform the audio mix since, as mentioned above, directional audio may be generated based on a relative direction from which an audio is virtually originated.

Location tracking utility 406 may be provided with virtual space configuration information, and may use the virtual space configuration information to enforce rules on the locations of avatars within a shared virtual space. For example, location tracking utility 406 may access space layout information (e.g., space sizing, physical barrier locations and characteristics, sound boundary locations and characteristics, special spatial characteristics for designated areas such as meeting rooms, break rooms, etc.) from a data store. Location tracking utility 406 may then enforce rules based on the space layout information. For example, location tracking utility 406 may enforce that avatars 314 do not move outside the virtual collaboration space, that avatars do not move through physical barriers or sound boundaries that they are not allowed through (as described in more detail below), that avatars do not occupy the same space at the same time, that only a certain number of avatars occupy a given space, and/or any other such rules as may serve a particular implementation.

Availability and profile tracking utility 408 may receive and process user input data so as to provide, in real time, information regarding various aspects of each user's profile and/or current availability status that are to be graphically reflected in the graphical user interface of the portal. For example, availability and profile tracking utility 408 may maintain images representative of each different user (e.g., profile photos of the users, etc.) that may be provided for display as part of the avatars 314 presented in the virtual collaboration space. As another example, availability and profile tracking utility 408 may manage invitations and/or acceptances of formal communication sessions, manage various settings and/or preferences for each user, and perform various other functions described herein. For instance, availability and profile tracking utility 408 may track whether each user is currently online, maintain data indicating which departments each user is part of and/or where the user fits in a reporting structure of an organization, manage a setting indicating whether a particular user has stereo audio capabilities that would support directional audio capabilities, and so forth.

Availability and profile tracking utility 408 may also receive and process additional user input data that may be sent deliberately by a user or provided automatically by a communication device to indicate a current availability of the user. For example, if a user decides to lower his or her availability (e.g., to disable impromptu communications in order to focus on a particular task), availability and profile tracking utility 408 may receive data indicating this preference and adjust an availability status for the user. As another example, if a user places or accepts a voice call, availability and profile tracking utility 408 may determine at the commencement of the voice call that the availability status for the user should be changed for the duration of the call and may update the status accordingly. Availability and profile tracking utility 408 may provide the status data to any of the other utilities. For example, by providing the status data to audio mixing utility 412, audio mixing utility 412 may determine how to mix audio for each user, including whether certain or all impromptu voice communications should be muted or included in the mix. Additionally, availability and profile tracking utility 408 may provide information to GUI utility 410 to allow proper availability status to be reflected in the user interface (e.g., by way of color or other indicators on each avatar).

GUI utility 410 may receive data from data input interface 404 and/or from various other utilities 406-416 or other sources as have been described above and may provide visual data (e.g., video data, data allowing for a GUI to be constructed and/or updated by communication devices 304, etc.) to each communication device 304 by way of data output interface 418. In this way, GUI utility 410 may facilitate each communication device 304 in presenting various graphical aspects of a virtual communications portal that displays virtual collaboration space 312. For example, based on all the input data received, GUI utility 410 may provide data sufficient to allow a communication device 304 to present a communication portal having a navigation panel (e.g., allowing users 302 to select different virtual collaboration spaces to enter, etc.), one or more virtual collaboration spaces such as virtual collaboration space 312, and/or any other display data as may be included in a particular implementation of the communication portal interface. Moreover, as avatars 314 move and change status, as sound boundaries are defined with various properties, as different views (e.g., 2D views, 3D views, etc.) are selected, and as other changes occur, GUI utility 410 may continually provide information allowing each communication device 304 to provide a coherent and relevant user interface to its respective user 302.

Audio mixing utility 412 may receive and process audio input data (e.g., by way of data input interface 404) and output audio data (e.g., by way of data output interface 418) to be presented to different users 302 by way of their respective communication devices 304. To this end, audio mixing utility 412 may include any sub-utilities as may serve to help perform certain audio-related tasks described herein. For example, as shown, audio mixing utility 412 may include an acoustic tracking utility 414 configured to simulate acoustic sound propagation with a virtual collaboration space, as well as an audio muting utility configured to track which audio input streams are to be mixed into which audio output streams (and which are to be muted by not being mixed in).

Audio mixing utility 412 may receive data from location tracking utility 406 (e.g., to determine where a particular user's avatar is located in relation to other users' avatars to properly mix impromptu communications), availability and profile tracking utility 408 (e.g., to determine if a user is logged in, to determine whether a user is engaging in a call or meeting, to determine whether the particular user's avatar is available to receive impromptu voice communication, etc.), and/or other utilities (e.g., including utilities not explicitly shown in FIG. 4) as may serve a particular implementation. Additionally, based on user input received by way of data input interface 404, audio mixing utility 412 may receive data indicative of sound boundaries, where the sound boundaries are to be defined, how long the sound boundaries are to be implemented, what properties the sound boundaries are to have, and so forth.

Within audio mixing utility 412, acoustic tracking utility 414 may track acoustic propagation of virtual sound through the virtual collaboration space as the virtual sound originates at one location (e.g., the avatar of a user who is speaking), interacts with various virtual surfaces (e.g., reflecting or reverberating off certain virtual surfaces, being absorbed by certain virtual surfaces, etc.), and ultimately arrives at another location where it can be perceived (e.g., the virtual ears of an avatar near the avatar whose user is speaking). As certain implementations of audio mixing utility 412 combine different sounds together into a single mix (e.g., a binaural audio stream including different audio communications from around the virtual collaboration space) to be presented to a particular user 302, acoustic tracking utility 414 may be configured to apply various filtering techniques, proximity effects, and so forth.

In certain examples, a binaural audio mix may be provided to a particular communication device 304 and acoustic tracking utility 414 may configure the audio data to simulate directional audio that will seem to the user 302 of that device to originate from a particular direction within the virtual collaboration space. In this way, a user may sense which direction audio communications originate from to help the user (along with visual cues provided by the user interface) to discern who is speaking. Additionally, acoustic tracking utility 414 may access data representative of various aspects affecting the acoustics of the shared virtual space (e.g., the location of virtual objects such as walls, cubicle partitions, etc., in the space; the virtual materials from which such virtual objects are constructed and their acoustic properties; etc.). By taking these types of data into account, acoustic tracking utility 414 may simulate the impact of virtual barriers on audio propagation, accurately simulate sound propagation within the virtual environment, and so forth.

Within audio mixing utility 412, audio muting utility 416 may track which input audio streams are to be included in which audio output mixes (e.g., output binaural streams) and which should be muted (i.e., not included) due to the presence of sound boundaries or for other suitable reasons. In certain implementations, sound boundaries may be defined and configured to operate acoustically. For example, a sound baffle object having certain acoustic and/or physical properties (e.g., muffling or completely blocking sound traveling in one or both directions, visible or invisible, traversable or non-traversable, etc.) may be inserted into the virtual collaboration space and may operate by blocking sound in accordance with its location and properties (e.g., based on the acoustic propagation simulation being performed by acoustic tracking utility 414, as described above). Rather than being implemented acoustically, however, other implementations may implement certain or all sound boundaries by selectively muting certain audio streams based on locations of the sound boundaries and locations of the avatars affected by the sound boundaries. For example, rather than implementing an acoustic sound baffle object that prevents audio communication in one or more directions using acoustic tracking utility 414, system 100 may use audio muting utility 416 to mute or otherwise prevent certain input audio communication (e.g., a voice communication spoken by a first user) from being delivered to certain users (e.g., a second user on the other side of a defined sound boundary).

Selectively muting certain audio communications in this way may be a highly efficient and effective way to implement sound boundaries having various properties (e.g., directionalities, etc.). In certain implementations, selective muting performed using audio muting utility 416 may even be utilized beyond the sound boundary function described above. For instance, the audio for private calls, private meetings held in separate rooms, and so forth, may likewise be efficiently implemented using audio muting utility 416. Two users who wish to have a private conference may virtually step into a virtual conference room that is automatically enclosed by sound boundaries implemented in the efficient ways described above (e.g., by muting audio communications from these two users from all other users such that only the two users are able to hear one another). This muting may be more efficient (e.g., computationally less expensive) than other ways of performing the same functionality, such as by generating a separate virtual collaboration space for the virtual conference room.

All of the utilities 406-416 described above may be implemented by dedicated or shared hardware and/or software resources of communication server 310 to implement functionality described herein. For instance, in certain examples, a single processor (or group of processors) associated with communication server 310 may execute software instructions to implement one or more of utilities 406-416. In other examples, each utility may be implemented by a separate server or server component (e.g., each being associated with a dedicated processor or the like) as may serve a particular embodiment.

Data output interface 418 may receive audio data, visual data, metadata, and/or any other suitable types of data from utilities 406-416, and may communicate this data as output data 420 (e.g., one or more binaural audio streams customized for particular users) to communication devices 304 by way of a network such as network 308. As such, like data input interface 404, data output interface 418 may be configured to communicate with communication devices 304 by way of any technologies and/or protocols supported by the network as may serve a particular implementation. In some examples, data output interface 418 may process, package, sort, address, and/or steer output data 420 to particular communication devices 304 to ensure that each communication device receives data relevant to the function of that communication device.

The components and functionality described above in relation to FIG. 4 may be implemented in one or more communication servers 310 in a distributed manner to facilitate scalability, redundancy, and service quality (e.g., latency reduction). As such, an individual communications server 310 may include one or more components described above, and may communicate amongst other communication servers 310 when necessary to access needed capabilities. Additionally, in some implementations, certain components or functions described above to be performed by communication server 310 may be implemented within or performed by systems or resources other than communication server resources. As one example, communication server 310 may run as a headless server without a graphical interface, and some or all of the functionality described above in relation to GUI utility 410 may be performed by communication devices 304 rather than communication server 310. In like manner, other functionality described in relation to utilities 406-416 may similarly be performed by individual client devices (e.g., communication devices 304), rather than performed at the server level, as may serve a particular implementation.

Returning to FIG. 3, virtual collaboration space 312 may be presented to both users 302 by way of their respective communication devices 304 as a shared world in which the users can see each others' avatars 314 in 2D or 3D or according to any customized view as may serve a particular implementation. As used herein, a virtual collaboration space may refer to any extended reality space in which users are able to communicate with one another, particularly by way of impromptu voice communications (e.g., by way of "always-on" channels allowing the users to hear what is going on around them in the virtual environment, to speak and be heard by those in the virtual vicinity without taking any specific steps to initiate a communication session, etc.). A virtual portal including virtual collaboration space 312 may be implemented by hardware and software of system 100, which, as described above, may be implemented and provided by communication server 310, communication devices 304, or a combination of these and/or other computing devices. Virtual collaboration space 312 may be presented when a user 302 logs into his or her device or signs into communication server 310 at the beginning of a workday, when user 302 authenticates himself or herself to join a convention or other event that makes use of virtual collaboration space 312, or otherwise comes online to begin communicating and collaborating with other users by way of system 100.

In some examples, the virtual portal presenting virtual collaboration space 312 may further include a navigation panel (not explicitly shown) having certain categories (e.g., "Departments," "Online Users," etc.) that may facilitate each user 302 in exploring and discovering communication possibilities, filtering potential people to communicate with in various ways, and so forth. For example, a section of a navigation panel for departments may allow a user to select a shared virtual space associated with a particular department (e.g., Product Design, Engineering, Product Management, Marketing, Sales, Executive Management, etc.) within the organization to see only users who are logged in to work in that department. As another example, a navigation panel may include an Online Users category that lists names of users who are online and may potentially be communicated with (e.g., based on designated availability statuses set by the user).

Virtual collaboration space 312 in this example may represent a particular space (e.g., the engineering department of a company, etc.), and, as such, avatars 314 for each user 302 who is signed in and associated with the particular space (e.g., the engineering department) may be represented within virtual collaboration space 312. Certain virtual collaboration spaces may be configured as public spaces that allow any user (e.g., any user of a particular communication service, any employee of a certain organization, etc.) to enter and collaborate within the space. In contrast, other virtual collaboration spaces may be restricted in various ways as may serve different particular implementations. As one example, a particular company may dedicate a virtual collaboration space to executive officers of the company and this area may be restricted such that other employees of the company are not allowed (e.g., without special permissions) to access the executive virtual collaboration space. These executive officers may have an ability to access virtual collaboration spaces associated with departments they oversee (or all departments), while other employees may only be able to access virtual collaboration spaces that are public or that relate to the department for which they work.

As shown, in this example, each avatar 314 is depicted as a circular token or profile icon that may include a depiction (e.g., a photo, a drawing or symbol, etc.) representative of the respective user. However, as mentioned above, avatars 314 may in certain examples be illustrated by other types of symbols, by 2D or 3D representations of the users, or in other suitable ways as may serve a particular implementation.

Any suitable information about a user 302 that a particular avatar 314 represents may be indicated by the visual information presented by the avatar 314 within virtual collaboration space 312. For example, one piece of information that is readily apparent by looking at avatars 314 is their respective locations 316 within virtual collaboration space 312. Other information that may be visually indicated by avatars 314 is the availability status of their respective users (indicated by color, symbolic design, flashing symbols, etc.), whether the users are actively speaking, and so forth.

Figure 6A:
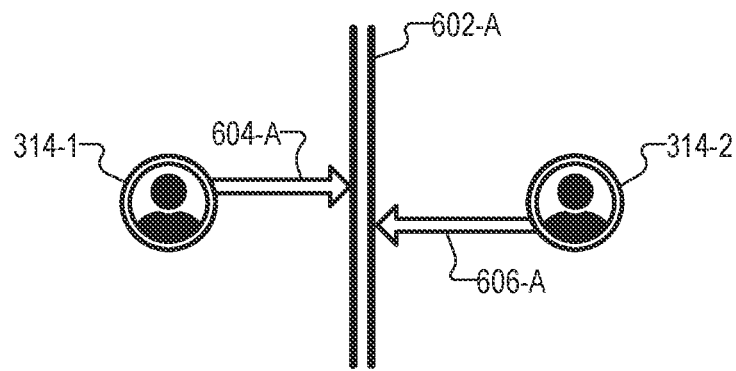
FIGS. 6A-6C show certain properties of illustrative sound boundaries located between avatars of users engaged in audio communications in accordance with principles described herein.
Figure 6B:
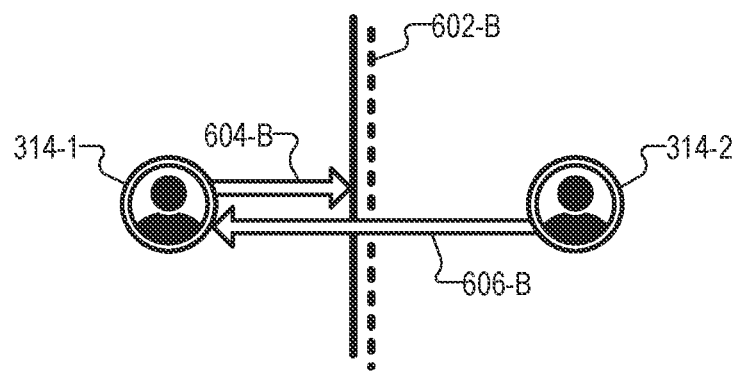
Figure 6C:
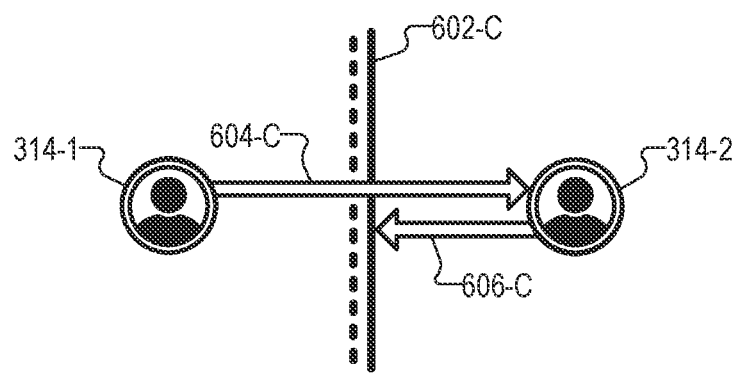
Figure 7A:
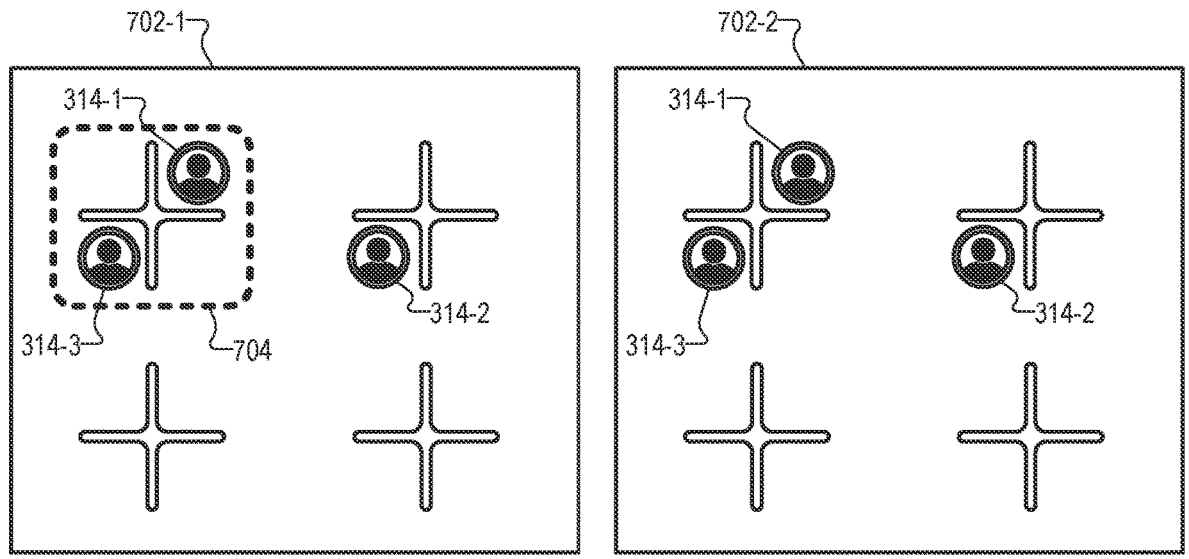
FIGS. 7A-7B show certain aspects of how illustrative sound boundaries may be displayed within graphical representations of a virtual collaboration space presented to different users in accordance with principles described herein.
Figure 7B:
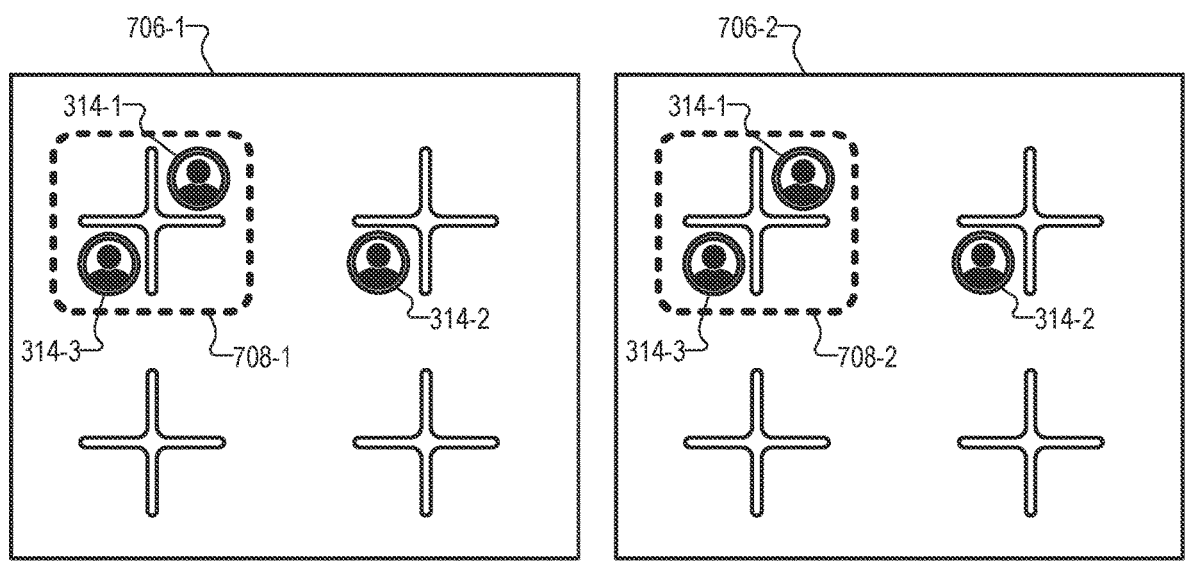
Figure 8A:
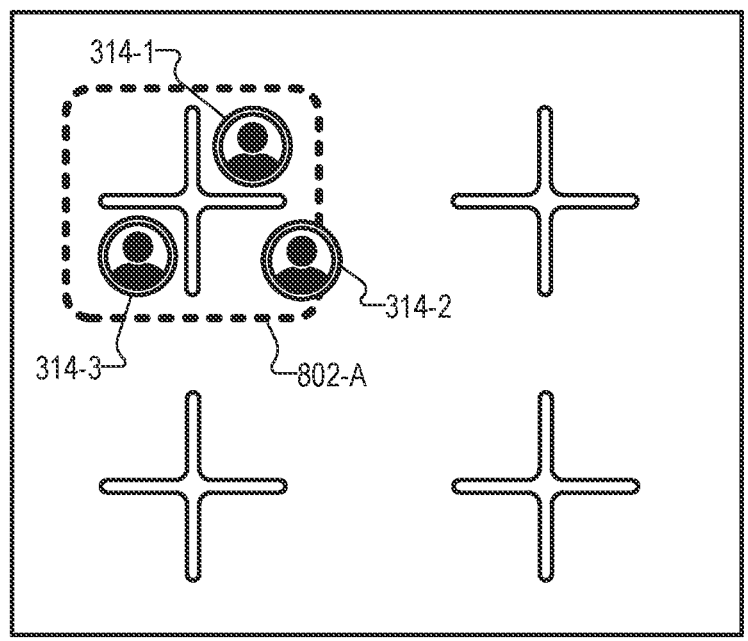
FIGS. 8A-8B show certain properties of illustrative sound boundaries defined by one user when another user attempts to move an avatar through the sound boundary in accordance with principles described herein.
Figure 8B:
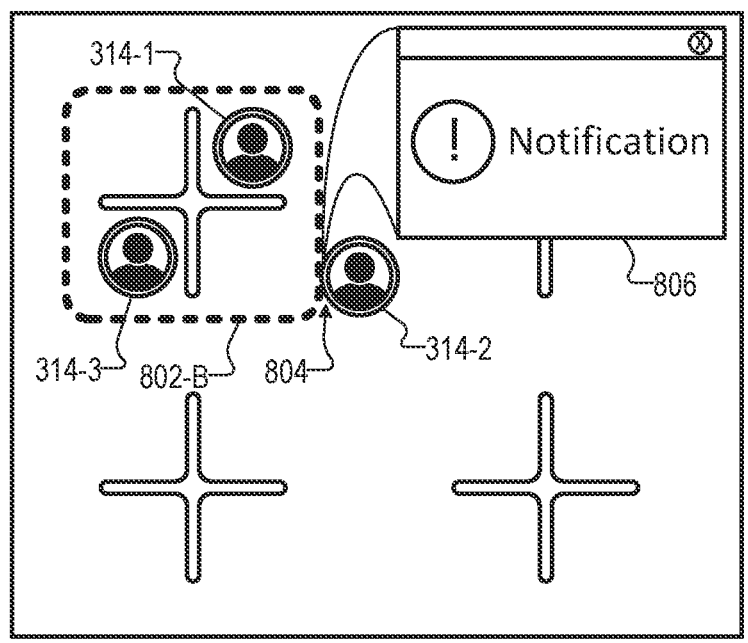

As has been described, sound boundaries may be defined that are placed within virtual collaboration space 312 to enable users 302 to have more control over impromptu voice communications they give and receive (e.g., to dynamically control which other users will hear their audio communications, to dynamically control who they are able to hear, etc.). Sound boundaries may have various different attributes and may be presented in virtual collaboration space 312 in accordance with various attributes that have been mentioned and that will now be described in more detail. Specifically, FIGS. 5A-5D illustrate different spatial and temporal properties of sound boundaries that may be defined for virtual collaboration space 312, FIGS. 6A-6C illustrate different directionality attributes that different sound boundaries may be configured to have, FIGS. 7A-7B show differences in how sound boundaries may be presented to different users, and FIGS. 8A-8B illustrate examples of different traversability characteristics that different sound boundaries may be given. It will be understood that the properties, attributes, characteristics, and examples described in relation to FIGS. 5A-8B are intended only to illustrate some of the possibilities of how sound boundaries may be implemented and used in illustrative implementations, and that combinations of these examples, as well as other examples not explicitly mentioned herein, may also fall within the scope and spirit of the following disclosure.

FIGS. 5A-5D show illustrative virtual collaboration experiences 500 (e.g., virtual collaboration experiences 500-A through 500-D in FIGS. 5A through 5D, respectively) that each involve a plurality of avatars 314 and different types of sound boundaries within virtual collaboration space 312. In each of virtual collaboration experiences 500, avatars 314-1 and 314-2 described above to represent users 302-1 and 302-2, respectively, are shown within virtual collaboration space 312 together with additional avatars 314-3, 314-4, and 314-5. These additional avatars 314 will be understood to represent additional users (not shown in FIG. 3) that likewise may be located remotely from users 302-1 and 302-2 and that are taking part in the virtual collaboration experience together with users 302-1 and 302-2.

Figure 5A:
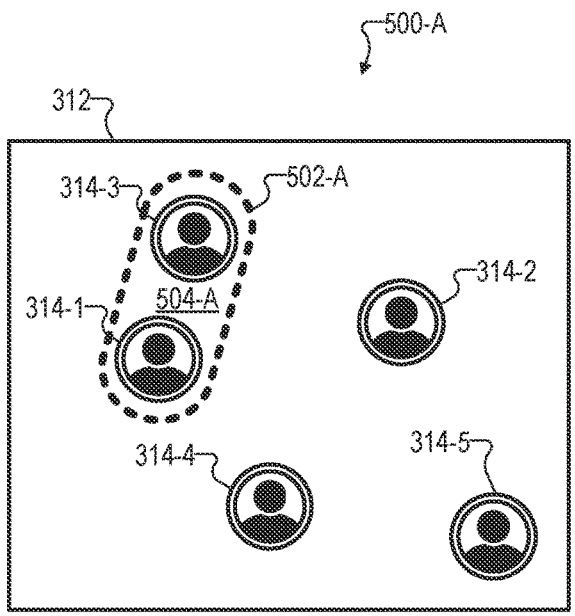
FIGS. 5A-5D show illustrative virtual collaboration experiences involving a plurality of avatars and different types of sound boundaries within a virtual collaboration space in accordance with principles described herein.

Virtual collaboration experience 500-A of FIG. 5A shows a first example of how a sound boundary 502-A may be implemented to enclose an area to be acoustically isolated from the rest of virtual collaboration space 312. Specifically, as shown in FIG. 5A, sound boundary 502-A encloses an area 504-A of virtual collaboration space 312 that includes the first location of the first avatar 314-1 (as well as a location of avatar 314-3) while excluding the second location of the second avatar 314-2 (as well as locations of avatars 314-4 and 314-5). For instance, the user represented by avatar 314-1 (i.e., user 302-1) may place sound boundary 502-A so as to facilitate a private conversation with the user represented by avatar 314-3 without worrying about whether the users represented by the other avatars (e.g., avatars 314-2, 314-4, and 314-5) will hear private subject matter of the conversation, will be distracted from their work by the conversation, or the like. As such, in this example, system 100 may prevent the audio communication between the users represented by avatars 314-1 and 314-3 by abstaining from presenting, to the second user and other users associated with avatars located outside of area 504-A (e.g., users represented by avatars 314-4 and 314-5), voice communication spoken by the first user represented by avatar 314-1 and the user represented by avatar 314-3.

Figure 5B:
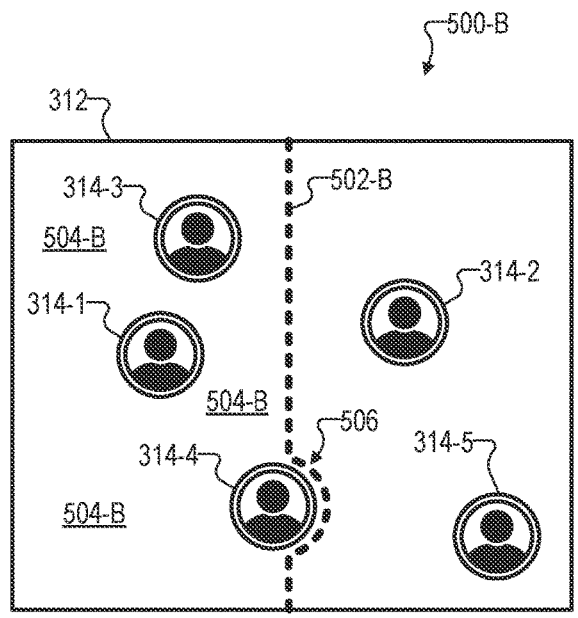

Virtual collaboration experience 500-B of FIG. 5B shows a second example of how a sound boundary 502-B may be implemented. In this example, virtual collaboration space 312 is split by sound boundary 502-B such that an area 504-B is enclosed not just by sound boundary 502-B but also by the walls of virtual collaboration space 312. In this example, the first user represented by avatar 314-1 may wish to speak to the user represented by avatar 314-3 and may not mind if others in the vicinity (e.g., people who sit nearby in the virtual space and are involved on work for the same projects as these users, etc.) are able to hear their conversation. However, the first user may not be sure how far his or her voice will carry through the virtual space and may therefore place sound boundary 502-B to ensure that users represented by avatars that sit further away (e.g., avatars 314-2 and 314-5, who may sit on the other side of the room and may be involved in other projects) are not bothered by the conversation.

While user input from the first user may indicate a straight-line sound boundary that is to divide the room (e.g., because such a line is convenient to draw using the user interface provided), it will be understood that system 100 may define sound boundary 502-B based on the user input while not necessarily defining the sound boundary in exactly the way the user input indicates. For example, as shown by a curve 506 in sound boundary 502-B, system 100 may be configured to automatically define sound boundary 502-B in a way that follows the straight line drawn by the user while bending to include or exclude avatars that the line would otherwise cut through (e.g., according to a setting that the user has already selected, etc.). In other examples, system 100 may define sound boundaries based on user input (but not necessarily fully comporting with the user input) in other ways. For instance, based on user preferences stored in a user profile (or based on default settings set by a designer of the virtual collaboration space and an absence of user settings contrary to the default settings, etc.), system 100 may automatically define a sound boundary that is integrated within the virtual collaboration space in a similar way as other virtual objects (e.g., furniture, walls, etc.) within the space. For instance, default settings or specific user preferences may cause sound boundaries to be automatically defined between desk clumps or different departments as may serve a particular organization or virtual collaboration space.

Figure 5C:
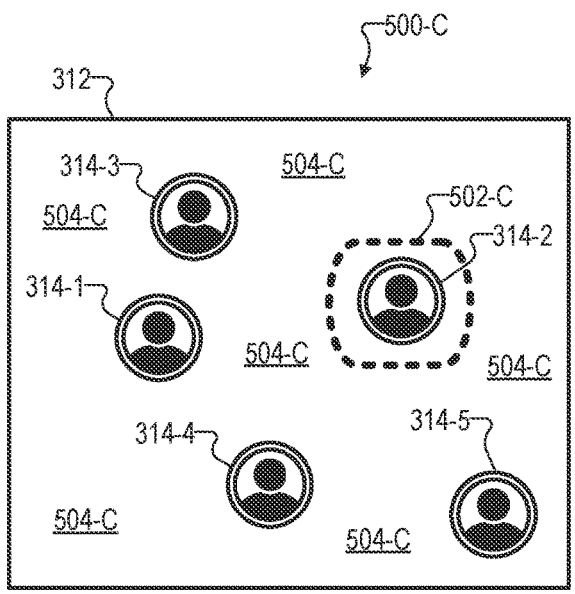

Virtual collaboration experience 500-C of FIG. 5C shows a third example of how a sound boundary 502-C may be implemented to enclose an area from the rest of virtual collaboration space 312. However, in contrast with virtual collaboration experience 500-A, this example isolates an area that is to be excluded from an area in which the first user wishes to be heard. Specifically, as shown in FIG. 5C, an area 504-C is shown to include the entire virtual collaboration space 312 except for an area enclosed by sound boundary 502-C (and which happens to include avatar 314-2). For example, if the first user represented by avatar 314-1 wishes to make an announcement that the second user represented by 314-2 is not to hear (e.g., an announcement regarding a surprise party to be thrown for the second user, etc.), sound boundary 502-C may be defined so that an impromptu voice communication spoken by the first user will be heard by everyone represented within virtual collaboration space 312 except for the second user represented by avatar 314-2.

FIGS. 5A-5C have illustrated a few examples of spatial characteristics that sound boundaries may be given as users provide input and system 100 defines the sound boundaries based on the user input. It will be understood that sound boundaries placed in other locations, as well as having other shapes and sizes and spatial characteristics, may similarly be implemented in a given example. Additionally, in certain examples, sound boundaries may be disjointed in ways that would not be possible for real-world sound baffles. For instance, a user may create a disjointed area that communicationally isolates his or her own avatar with one or more other avatars in similar ways as areas 504 described above. As one example, the user may use a disjointed sound boundary to isolate his or her own avatar and two other avatars in different parts of the virtual collaboration space. Specifically, the user may direct system 100 to define a sound boundary with three distinct and disjointed (i.e., non-adjacent) sections including one around the user's own avatar and two around the other two avatars.

Along with spatial configurability, sound boundaries defined by system 100 may also be highly configurable with respect to temporal aspects (e.g., when the sound boundaries begin functioning, stop functioning, etc.). For example, subsequent to one of sound boundaries 502 (e.g., sound boundaries 502-A, 502-B, or 502-C) being in place and system 100 preventing audio communication based on the sound boundary 502, system 100 may detect an expiration of the sound boundary 502 and, in response to the detecting of the expiration of the sound boundary, may cease the preventing of the audio communication between the first user and the second user. The expiration of the sound boundary may be based on a set time that the user indicated when setting up the sound boundary, a default timer that has expired, an automatic detection that the conversation for which the sound boundary was created has now ceased, or any other suitable factors or conditions. Based on the expiration, the sound boundary 502 may be removed so that system 100 ceases preventing the audio communication.

Figure 5D:
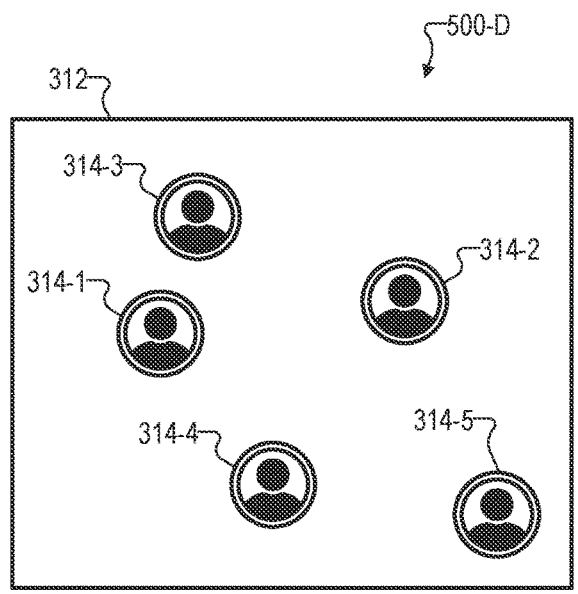

To illustrate, FIG. 5D shows an example in which no sound boundary 502 is defined for virtual collaboration space 312 during a virtual collaboration experience 500-D. For instance, this virtual collaboration experience may represent the status of audio communication after a sound boundary has expired or otherwise been removed and no audio communication is being prevented.

Along with spatial and temporal properties of sound boundaries that have been described, sound boundary may also be simulated to have customizable physical properties, including properties that are possible only for virtual objects and not for real objects. For example, while no real-world material may exist to perfectly absorb or block all sound in the real world, a virtual sound baffle object could be simulated to not only attenuate sound to any desirable degree (e.g., including up to perfectly blocking 100% of sound by fully muting it), but to block it only in one direction while have no effect on sound traveling in another direction, or to block sound only from certain avatars while having no effect on audio communication from other avatars. As another example, sound may be completely muted in one direction, while being scrambled or partially muffled in the other direction (e.g., such that sound still is present but voices are unintelligible, etc.).

FIGS. 6A-6C illustrate certain of these physical properties that sound boundaries may have. Specifically, in each of FIGS. 6A-6C, a respective sound boundary 602 (e.g., sound boundary 602-A in FIG. 6A, sound boundary 602-B in FIG. 6B, sound boundary 602-C in FIG. 6C), is shown to have different directionality attributes. These attributes are illustrated to manifest themselves by way of what happens to voice communications 604 (e.g., voice communications 604-A through 604-C in FIGS. 6A-6C) spoken by a first user represented by avatar 314-1 and voice communications 606 (e.g., voice communications 606-A through 606-C in FIGS. 6A-6C) spoken by a second user represented by avatar 314-2. As shown, voice communications 604 and 606 may each either be prevented or allowed in accordance with the respective directionality attributes of the relevant sound boundary 602 that the audio communication encounters. Specifically, a notation is used in these examples in which a solid line on a particular side of the sound boundary indicates that audio communications originating on that side of the sound boundary will be prevented from passing through the sound boundary, while a dotted line on a particular side of the sound boundary indicates that the audio communications originating on that side of the sound boundary will be allowed through.

In FIG. 6A, sound boundary 602-A is shown to include solid lines on both sides of the boundary. Accordingly, in this example, system 100 may perform the preventing of the audio communication bidirectionally. For instance, the preventing of operation 206 may include abstaining from presenting, to the first user (i.e., the user represented by avatar 314-1), a voice communication 606-A spoken by the second user (i.e., the user represented by avatar 314-2), and also abstaining from presenting, to the second user, a voice communication 604-A spoken by the first user. This is illustrated in FIG. 6A by both voice communications 604-A and 606-A being shown to be blocked by sound boundary 602-A (i.e., such that neither is allowed through the boundary to reach the avatar on the opposite side).

In FIG. 6B, sound boundary 602-B is shown to include a solid line on the side of the boundary with avatar 314-1 while having a dotted line on the side of the boundary with avatar 314-2. Accordingly, in this example, system 100 may perform the preventing of the audio communication unidirectionally. For instance, the preventing of operation 206 may include presenting, to the first user, a voice communication 606-B spoken by the second user, while abstaining from presenting, to the second user, a voice communication 604-B spoken by the first user. This is illustrated in FIG. 6B by voice communication 604-B being shown to be blocked by sound boundary 602-B while voice communication 606-B is shown to be allowed through the boundary to reach avatar 314-1 on the opposite side.

In FIG. 6C, sound boundary 602-C is shown to include a dotted line on the side of the boundary with avatar 314-1 while having a solid line on the side of the boundary with avatar 314-2. Accordingly, as in the example of FIG. 6B, system 100 may again perform the preventing of the audio communication unidirectionally, albeit in the opposite direction for this example. Specifically, the preventing of operation 206 in this case may include abstaining from presenting, to the first user, a voice communication 606-C spoken by the second user, while presenting, to the second user, a voice communication 604-C spoken by the first user. This is illustrated in FIG. 6C by voice communication 604-C being shown to be allowed through the boundary to reach avatar 314-2 while voice communication 606-C is shown to be blocked by sound boundary 602-C.

Another attribute that may be assigned to sound boundaries (e.g., either automatically, by default, as directed based on user input, or on another suitable basis) relates to the appearance of the sound boundary. For example, sound boundaries may be configured to be visibly displayed within the virtual collaboration space or to be made invisible (i.e., not displayed within a presentation of the virtual collaboration space). If a sound boundary is displayed, any suitable design, color, transparency, line thickness, or other graphical characteristic may be attributed to the sound boundary as may serve a particular implementation. Additionally, while lines and shapes (e.g., ellipses, rectangles, etc.) such as those illustrated herein may be employed for a 2D view of a virtual collaboration space, there may be various options (e.g., including customizable options selectable based on user input) for how sound boundaries may be presented in the 3D mode described above. For example, a sound boundary may be presented as a partially transparent or fully opaque wall drawn within the virtual collaboration space that stretches from the floor to the ceiling. In other examples, a line may be drawn on the floor or visible sound waves may appear to bounce off of (e.g., be blocked by) an invisible or nearly invisible force field. Various other examples may also be used in either the 2D or 3D mode to help users understand where sound boundaries are within the virtual collaboration space when the users are intended to know that the virtual collaboration space exists.

In certain examples, only the user that provides the user input on which the defining of a sound boundary is based may be able to see the sound boundary (or to see it in its full form). For instance, the first user may wish to create a sound boundary enclosing his or her own avatar (e.g., avatar 314-1) and the avatar of an additional user (e.g., such as shown in FIG. 5A for avatars 314-1 and 314-3) such that they can have a private conversation. Whether these users wish for other users in the virtual collaboration space to see the sound boundary enabling their private conversation may be a decision that is made by default or a user setting in certain implementations, or a decision that can be made on a case-by-case base in other implementations.

To illustrate, FIG. 7A shows certain aspects of how an illustrative sound boundary may be displayed within graphical representations of a virtual collaboration space presented to different users. In FIG. 7A, a first graphical representation 702-1 of a virtual collaboration space (e.g., virtual collaboration space 312) may be presented to a first user represented within the virtual collaboration space by avatar 314-1, and a second graphical representation 702-2 of the virtual collaboration space may be presented to a second user represented within the virtual collaboration space by avatar 314-2. As shown in FIG. 7A, while both graphical representations 702 show avatars 314-1 through 314-3 and other objects (e.g., desk clumps, etc.) within the virtual collaboration space, only graphical representation 702-1 shows a graphical object 704 representative of a sound boundary that the first user represented by avatar 314-1 has directed to enclose avatars 314-1 and 314-3. No corresponding graphical object is displayed in graphical representation 702-2 of the virtual collaboration space, such that the second user represented by avatar 314-2 is not apprised that a private conversation is occurring between the users represented by avatars 314-1 and 314-3.

More particularly, system 100 is shown to be displaying, within first graphical representation 702-1 of the virtual collaboration space presented to the first user, graphical object 704 representative of the sound boundary, even while abstaining from displaying, within second graphical representation 702-2 of the virtual collaboration space presented to the second user, any graphical object representative of the sound boundary.

In contrast, FIG. 7B shows certain aspects of how another illustrative sound boundary may be displayed within graphical representations of a virtual collaboration space presented to different users. In FIG. 7B, a first graphical representation 706-1 of a virtual collaboration space (e.g., virtual collaboration space 312) may be presented to the first user represented within the virtual collaboration space by avatar 314-1, and a second graphical representation 706-2 of the virtual collaboration space may be presented to the second user represented within the virtual collaboration space by avatar 314-2. As in FIG. 7A, FIG. 7B shows both graphical representations 706 displaying avatars 314-1 through 314-3, as well as other graphical objects present in the virtual collaboration space. Unlike FIG. 7A, however, corresponding graphical objects 708-1 and 708-2, representative of a sound boundary that the first user has directed to enclose avatars 314-1 and 314-3, are shown to be presented to both users. That is, graphical objects 708 (e.g., graphical object 708-1 in graphical representation 706-1 and graphical object 708-2 in graphical representation 706-2) are displayed in both graphical representations 706 of the virtual collaboration space such that both the first and the second users are apprised of the private conversation that is occurring.

More particularly, system 100 is shown to be displaying, within first graphical representation 706-1 of the virtual collaboration space presented to the first user, graphical object 708-1 representative of the sound boundary. System 100 also displays, within second graphical representation 706-2 of the virtual collaboration space presented to the second user, graphical object 708-2 representative of the sound boundary.

Yet another characteristic of sound boundaries that may be implemented (e.g., configured by default or user setting, customized by a user on a case-by-case basis as sound boundaries are generated, etc.) is a traversability property of the sound boundaries. A traversability property of a sound boundary may determine whether certain avatars that are affected by the sound boundary (e.g., avatars excluded from the sound boundary) are to be allowed to pass through the sound boundary (e.g., to enter into the boundary such that they would be able to hear audio communications happening inside the boundary), and, if so, under what circumstances this traversal may take place.

In some examples, the preventing of audio communications may be set at a time that a sound boundary is defined and not altered again based on changing locations of the avatars. Thus, in these examples, if a sound boundary were to be defined to isolate three users from two other users within the virtual collaboration space (e.g., such that the three users could hear one another but their audio communications would be prevented from being heard by the other two users), the properties of the sound boundary would remain statically associated with the avatars themselves, rather than being updated based on the avatar locations. As such, the three users in this example would continue to be isolated from the two other users even if the three users were to direct their avatars to exit the area confined by the sound boundary or the two other users were to bring their avatars into that area. This audio communication prevention configuration may remain in effect for as long as the sound boundary persists (e.g., until the boundary expires, is canceled, etc.).

In contrast, other examples may continuously update the selective muting of certain users based on avatar location (rather than based on the avatars themselves) as the avatars continue to move after the moment of a sound boundary being generated. Accordingly, it could be possible for an excluded avatar to move into an area enclosed by a sound boundary and to begin hearing audio communications that were previously prevented. To address this latter type of example in which the real-time locations of dynamically moving avatars may influence what their respective users are able to hear (e.g., because the avatars may move into and out of established sound boundaries), each sound boundary may have a traversability property that determines whether avatars can freely pass through the boundary (as if the boundary doesn't exist), are disallowed from passing through boundary (as if the boundary is a solid wall or other object), or whether another restriction is imposed on the traversability of the sound boundary (e.g., permission must be granted for transversal, a notification of the traversal is provided to a creator of the sound boundary, etc.).

To illustrate, FIGS. 8A-8B show different traversability properties of illustrative sound boundaries defined by one user when another user attempts to move an avatar through the sound boundary. Specifically, in both examples, the second user attempts to move avatar 314-2 into an area enclosed by a sound boundary 802 (e.g., sound boundary 802-A in the example of FIG. 8A and sound boundary 802-B in the example of FIG. 8B) while the sound boundary is actively preventing audio communications between avatars 314-1 and 314-2.

In the example of FIG. 8A, it is shown that system 100 allows the second user to move avatar 314-1 through sound boundary 802-A without restriction. As shown, avatar 314-2 is able to move from a location external to the area enclosed by sound boundary 802-A (e.g., a location such as shown in FIGS. 7A and 7B) to a location internal to the enclosed area. As such, once avatar 314-2 traverses sound boundary 802-A to enter the enclosed area, audio communications between the second user and the first user that were previously prevented may suddenly become allowed (i.e., no longer prevented such that the second user is suddenly able to speak to and/or hear communication from the first user).

In contrast, in the example of FIG. 8B, system 100 may associate a collider to disallow passage of avatar 314-2 through sound boundary 802-B or otherwise impose a restriction on the second user with regard to moving avatar 314-2 through sound boundary 802-B. Restrictions imposed on avatar 314-2 when it is moved from a location external to the area enclosed by sound boundary 802-B to a location 804 at which the avatar attempts to enter into the enclosed area may include any suitable restrictions. For instance, the sound boundary may simply impose a physical restriction that does not allow traversal at all, such that avatar 314-2 runs up against the sound boundary in a same way it would run up against a wall or other solid object. As another example, a notification 806 may be presented when the second user moves avatar 314-2 to location 804. In certain examples, notification 806 may be configured to inform the first user (i.e., the user who set up sound boundary 802-B with avatar 314-2 excluded) and/or the second user that audio communications between them are no longer prevented (e.g., due to the new location of avatar 314-2). In other examples, notification 806 may provide options to the first user such that the first user can choose to allow or disallow traversal of avatar 314-2, send a message to the second user, or perform some other action as may serve a particular implementation.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory (DRAM), which typically constitutes a main memory. Common forms of computer-readable media include, for example, a disk, hard disk, magnetic tape, any other magnetic medium, a compact disc read-only memory (CD-ROM), a digital video disc (DVD), any other optical medium, random access memory (RAM), programmable read-only memory (PROM), electrically erasable programmable read-only memory (EPROM), FLASH-EEPROM, any other memory chip or cartridge, or any other tangible medium from which a computer can read.

Figure 9:
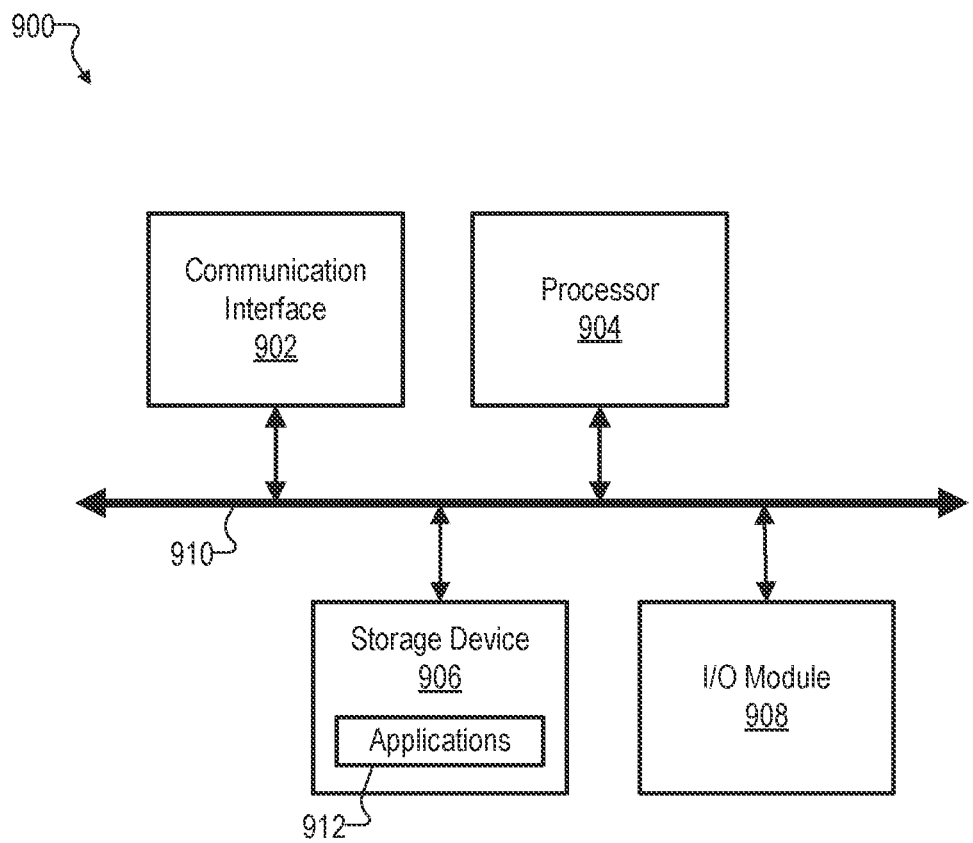
FIG. 9 shows an illustrative computing device that may implement collaboration space provider systems and/or other systems and devices described herein in accordance with principles described herein.

FIG. 9 shows an illustrative computing device 900 that may implement collaboration space provider systems and/or other systems and devices described herein in accordance with principles described herein. For example, computing device 900 may include or implement (or partially implement) a collaboration space provider system such as system 100 or any component included therein or any system associated therewith (e.g., communication devices 304, elements of network 308, communication servers 310, etc.).

As shown in FIG. 9, computing device 900 may include a communication interface 902, a processor 904, a storage device 906, and an input/output (I/O) module 908 communicatively connected via a communication infrastructure 910. While an illustrative computing device 900 is shown in FIG. 9, the components illustrated in FIG. 9 are not intended to be limiting. Additional or alternative components may be used in other embodiments. Components of computing device 900 shown in FIG. 9 will now be described in additional detail.

Communication interface 902 may be configured to communicate with one or more computing devices. Examples of communication interface 902 include, without limitation, a wired network interface (such as a network interface card), a wireless network interface (such as a wireless network interface card), a modem, an audio/video connection, and any other suitable interface.

Processor 904 generally represents any type or form of processing unit capable of processing data or interpreting, executing, and/or directing execution of one or more of the instructions, processes, and/or operations described herein. Processor 904 may direct execution of operations in accordance with one or more applications 912 or other computer-executable instructions such as may be stored in storage device 906 or another computer-readable medium.

Storage device 906 may include one or more data storage media, devices, or configurations and may employ any type, form, and combination of data storage media and/or device. For example, storage device 906 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 906. For example, data representative of one or more executable applications 912 configured to direct processor 904 to perform any of the operations described herein may be stored within storage device 906. In some examples, data may be arranged in one or more databases residing within storage device 906.

I/O module 908 may include one or more I/O modules configured to receive user input and provide user output. One or more I/O modules may be used to receive input for a single virtual experience. I/O module 908 may include any hardware, firmware, software, or combination thereof supportive of input and output capabilities. For example, I/O module 908 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 908 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 900. For example, one or more applications 912 residing within storage device 906 may be configured to direct processor 904 to perform one or more processes or functions associated with processor 104 of system 100. Likewise, memory 102 of system 100 may be implemented by or within storage device 906.

To the extent the aforementioned embodiments collect, store, and/or employ personal information of individuals, groups, or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information may be in an appropriately secure manner reflective of the type of information, for example, through various access control, encryption, and anonymization techniques for particularly sensitive information.

In the preceding specification, various example embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The specification and drawings are accordingly to be regarded in an illustrative rather than a restrictive sense.

What is claimed is:

1. A method comprising:
providing, by a collaboration space provider system, a virtual collaboration experience that allows for audio communication between a plurality of users represented by a plurality of avatars located within a virtual collaboration space;
defining, by the collaboration space provider system and based on user input from a first user included in the plurality of users and represented by a first avatar located within the virtual collaboration space, a sound boundary between a first location of the first avatar within the virtual collaboration space and a second location of a second avatar within the virtual collaboration space, the second avatar representing a second user included in the plurality of users; and
preventing, by the collaboration space provider system and based on the sound boundary within the virtual collaboration space between the first and second locations, audio communication in at least one direction between the first user and the second user.

2. The method of claim 1, wherein the preventing of the audio communication is performed bidirectionally to include:
abstaining from presenting, to the first user, a voice communication spoken by the second user; and
abstaining from presenting, to the second user, a voice communication spoken by the first user.

3. The method of claim 1, wherein the preventing of the audio communication is performed unidirectionally to include:
presenting, to the first user, a voice communication spoken by the second user; and
abstaining from presenting, to the second user, a voice communication spoken by the first user.

4. The method of claim 1, wherein the preventing of the audio communication is performed unidirectionally to include:
abstaining from presenting, to the first user, a voice communication spoken by the second user; and
presenting, to the second user, a voice communication spoken by the first user.

5. The method of claim 1, further comprising:
displaying, by the collaboration space provider system and within a first graphical representation of the virtual collaboration space presented to the first user, a graphical object representative of the sound boundary;
abstaining from displaying, by the collaboration space provider system and within a second graphical representation of the virtual collaboration space presented to the second user, any graphical object representative of the sound boundary; and
allowing, by the collaboration space provider system, the second user to move the second avatar through the sound boundary without restriction.

6. The method of claim 1, further comprising:
displaying, by the collaboration space provider system and within a first graphical representation of the virtual collaboration space presented to the first user, a first graphical object representative of the sound boundary;
displaying, by the collaboration space provider system and within a second graphical representation of the virtual collaboration space presented to the second user, a second graphical object representative of the sound boundary; and
allowing, by the collaboration space provider system, the second user to move the second avatar through the sound boundary without restriction.

7. The method of claim 1, further comprising:
displaying, by the collaboration space provider system and within a first graphical representation of the virtual collaboration space presented to the first user, a first graphical object representative of the sound boundary;
displaying, by the collaboration space provider system and within a second graphical representation of the virtual collaboration space presented to the second user, a second graphical object representative of the sound boundary; and
imposing, by the collaboration space provider system, a restriction on the second user with regard to moving the second avatar through the sound boundary.

8. The method of claim 1, wherein:
the sound boundary encloses an area of the virtual collaboration space that includes the first location of the first avatar and excludes the second location of the second avatar; and
the preventing of the audio communication includes abstaining from presenting, to the second user and any other users associated with avatars located outside of the area enclosed by the sound boundary, a voice communication spoken by the first user.

9. The method of claim 1, further comprising:
detecting, by the collaboration space provider system and subsequent to the preventing of the audio communication based on the sound boundary, an expiration of the sound boundary; and
ceasing, by the collaboration space provider system and in response to the detecting of the expiration of the sound boundary, the preventing of the audio communication between the first user and the second user.

10. The method of claim 1, wherein the virtual collaboration space is a virtual office workspace and the virtual collaboration experience is associated with an office workday during which the plurality of users collaborate on one or more tasks within the virtual office workspace.

11. A system comprising:
a memory storing instructions; and
a processor communicatively coupled to the memory and configured to execute the instructions to:
provide a virtual collaboration experience that allows for audio communication between a plurality of users represented by a plurality of avatars located within a virtual collaboration space;
define, based on user input from a first user included in the plurality of users and represented by a first avatar located within the virtual collaboration space, a sound boundary between a first location of the first avatar within the virtual collaboration space and a second location of a second avatar within the virtual collaboration space, the second avatar representing a second user included in the plurality of users; and
prevent, based on the sound boundary within the virtual collaboration space between the first and second locations, audio communication in at least one direction between the first user and the second user.

12. The system of claim 11, wherein the preventing of the audio communication is performed bidirectionally to include:

abstaining from presenting, to the first user, a voice communication spoken by the second user; and abstaining from presenting, to the second user, a voice communication spoken by the first user.

13. The system of claim 11, wherein the preventing of the audio communication is performed unidirectionally to include:

presenting, to the first user, a voice communication spoken by the second user; and abstaining from presenting, to the second user, a voice communication spoken by the first user.

14. The system of claim 11, wherein the preventing of the audio communication is performed unidirectionally to include:

abstaining from presenting, to the first user, a voice communication spoken by the second user; and presenting, to the second user, a voice communication spoken by the first user.

15. The system of claim 11, wherein the processor is further configured to execute the instructions to:

display, within a first graphical representation of the virtual collaboration space presented to the first user, a graphical object representative of the sound boundary;

abstain from displaying, within a second graphical representation of the virtual collaboration space presented to the second user, any graphical object representative of the sound boundary; and allow the second user to move the second avatar through the sound boundary without restriction.

16. The system of claim 11, wherein the processor is further configured to execute the instructions to:

display, within a first graphical representation of the virtual collaboration space presented to the first user, a first graphical object representative of the sound boundary;

display, within a second graphical representation of the virtual collaboration space presented to the second user, a second graphical object representative of the sound boundary; and allow the second user to move the second avatar through the sound boundary without restriction.

17. The system of claim 11, wherein the processor is further configured to execute the instructions to:

display, within a first graphical representation of the virtual collaboration space presented to the first user, a first graphical object representative of the sound boundary;

display, within a second graphical representation of the virtual collaboration space presented to the second user, a second graphical object representative of the sound boundary; and imposing a restriction on the second user with regard to moving the second avatar through the sound boundary.

18. The system of claim 11, wherein:

the sound boundary encloses an area of the virtual collaboration space that includes the first location of the first avatar and excludes the second location of the second avatar; and the preventing of the audio communication includes abstaining from presenting, to the second user and any other users associated with avatars located outside of the area enclosed by the sound boundary, a voice communication spoken by the first user.

19. The system of claim 11, wherein the processor is further configured to execute the instructions to:

detect, subsequent to the preventing of the audio communication based on the sound boundary, an expiration of the sound boundary; and cease, in response to the detecting of the expiration of the sound boundary, the preventing of the audio communication between the first user and the second user.

20. A non-transitory computer-readable medium storing instructions that, when executed, direct a processor of a computing device to:

provide a virtual collaboration experience that allows for audio communication between a plurality of users represented by a plurality of avatars located within a virtual collaboration space;

define, based on user input from a first user included in the plurality of users and represented by a first avatar located within the virtual collaboration space, a sound boundary between a first location of the first avatar within the virtual collaboration space and a second location of a second avatar within the virtual collaboration space, the second avatar representing a second user included in the plurality of users; and prevent, based on the sound boundary within the virtual collaboration space between the first and second locations, audio communication in at least one direction between the first user and the second user.

* * * * *